(12) United States Patent
Yumoto

(10) Patent No.: US 9,851,260 B2
(45) Date of Patent: Dec. 26, 2017

(54) SENSOR FIXTURE

(71) Applicant: TLV CO., LTD.., Kakogawa shi, Hyogo (JP)

(72) Inventor: Hideaki Yumoto, Kakogawa (JP)

(73) Assignee: TLV Co., Ltd., Hyogo (JP)

( * ) Notice: Subject to any disclaimer, the term of this patent is extended or adjusted under 35 U.S.C. 154(b) by 0 days.

(21) Appl. No.: 14/904,204

(22) PCT Filed: Feb. 7, 2014

(86) PCT No.: PCT/JP2014/067608
§ 371 (c)(1),
(2) Date: Jan. 11, 2016

(87) PCT Pub. No.: WO2015/012075
PCT Pub. Date: Jan. 29, 2015

(65) Prior Publication Data
US 2016/0161341 A1    Jun. 9, 2016

(30) Foreign Application Priority Data

Jul. 24, 2013  (JP) .................................. 2013-153190

(51) Int. Cl.
*E21B 47/01* (2012.01)
*G01K 1/14* (2006.01)
(Continued)

(52) U.S. Cl.
CPC ................ *G01K 1/143* (2013.01); *F16B 2/10* (2013.01); *F16M 13/022* (2013.01);
(Continued)

(58) Field of Classification Search
CPC ......... E21B 47/01; G01M 3/2807; F16L 3/10; F16L 3/1075; G01F 15/18; G01K 1/143
See application file for complete search history.

(56) References Cited

U.S. PATENT DOCUMENTS

| | | | |
|---|---|---|---|
| 1,963,908 A | * | 6/1934 | Manasek .................. F16L 3/10 |
| | | | 248/316.1 |
| 2,876,027 A | | 3/1959 | Sulmonetti |

(Continued)

FOREIGN PATENT DOCUMENTS

| | | |
|---|---|---|
| FR | 2724727 A1 | 3/1996 |
| JP | 56125511 | 9/1981 |

(Continued)

OTHER PUBLICATIONS

International Search Report, dated Aug. 12, 2014, issued in corresponding International Application No. PCT/JP2014/067608.

*Primary Examiner* — Bradley Duckworth
(74) *Attorney, Agent, or Firm* — The Webb Law Firm

(57) ABSTRACT

A sensor fixture 100 includes a clamp body 1, a sensor 9 threadedly coupled to a center portion of the clamp body 1, clamp arms 2 and 3 respectively attached to the left and right of the clamp body 1, protrusions 4 and 5 respectively provided to the clamp arms 2 and 3, and a fixing bolt 15 attached to lower end portions of the clamp arms 2 and 3. The sensor 9 can be easily and firmly fixed by supporting a sensor attaching part at three points with the sensor 9 attached to the clamp body 1, and the protrusions 4 and 5 of the left and right clamp arms 2 and 3.

9 Claims, 4 Drawing Sheets

(51) Int. Cl.
*F16B 2/10* (2006.01)
*G01D 11/30* (2006.01)
*F16M 13/02* (2006.01)
*G01H 11/08* (2006.01)
*G01K 7/02* (2006.01)

(52) U.S. Cl.
CPC ............ *G01D 11/30* (2013.01); *G01H 11/08* (2013.01); *G01K 7/02* (2013.01)

(56) References Cited

U.S. PATENT DOCUMENTS

| | | | | |
|---|---|---|---|---|
| 3,526,381 | A * | 9/1970 | Pepe | F16L 3/10 248/71 |
| 3,797,079 | A * | 3/1974 | Nixon | F16L 3/1075 24/285 |
| 4,761,024 | A * | 8/1988 | Ewen | B29C 65/7802 137/318 |
| 4,840,068 | A * | 6/1989 | Mayhew, Jr. | G01L 19/0046 73/706 |
| 4,921,386 | A * | 5/1990 | McArthur | E21B 19/16 414/22.51 |
| 5,471,739 | A * | 12/1995 | Fetzer | F16L 23/00 29/237 |
| 6,340,059 | B1 * | 1/2002 | Bethea | A62C 31/02 169/16 |
| 6,996,976 | B2 * | 2/2006 | Rumminger | F01N 13/008 204/421 |
| 7,209,047 | B2 * | 4/2007 | Newberg | F16B 31/028 285/12 |
| 7,395,720 | B2 * | 7/2008 | Wiest | G01F 1/662 73/761 |
| 7,552,643 | B2 * | 6/2009 | Aikens | G01M 3/22 73/198 |
| 7,821,411 | B1 * | 10/2010 | Ward | G01F 23/266 340/608 |
| 8,736,821 | B2 * | 5/2014 | Smith | G01B 11/165 356/32 |
| 8,941,821 | B2 * | 1/2015 | Coupe | G01B 11/06 356/32 |
| 9,297,217 | B2 * | 3/2016 | Paulsson | E21B 47/01 |
| 9,512,711 | B2 * | 12/2016 | Sobolewski | E21B 47/01 |
| 9,512,714 | B2 * | 12/2016 | Sobolewski | E21B 47/01 |
| 2014/0202767 | A1 * | 7/2014 | Feasey | E21B 21/08 175/57 |
| 2014/0306828 | A1 * | 10/2014 | Trescott | E03B 7/003 340/605 |
| 2015/0107379 | A1 * | 4/2015 | Rose | G01F 15/18 73/866.5 |
| 2015/0135847 | A1 * | 5/2015 | Takahama | G01L 1/2206 73/856 |
| 2015/0219264 | A1 * | 8/2015 | Tailor | F16L 47/22 156/86 |
| 2016/0047187 | A1 * | 2/2016 | Dirksen | E21B 33/085 175/6 |

FOREIGN PATENT DOCUMENTS

| | | |
|---|---|---|
| JP | 6282407 U | 5/1987 |
| JP | 2102004 U | 8/1990 |
| JP | 10-220421 | 8/1998 |
| JP | 2001-004081 | 1/2001 |
| JP | 2004-263789 | 9/2004 |

* cited by examiner

SENSOR FIXTURE

TECHNICAL FIELD

The present invention relates to a sensor fixture which fixes a sensor to a variety of valves, steam traps, or circular cylindrical parts or polygonal parts of piping, etc.

BACKGROUND ART

Some conventional sensor fixtures fix a sensor to a rotary shaft. The conventional sensor fixtures include a long band for being wound around the rotary shaft, and a stopper metal fitting provided with a ratchet mechanism into which the band is inserted. Thus, the sensor can be fixed to the rotary shaft of any diameter, from small one to large one, with one fixture (for example, refer to Patent Document 1).

These sensor fixtures may not firmly fix the sensor since the long band is used.

REFERENCE DOCUMENT OF CONVENTIONAL ART

Patent Document

Patent Document 1: JPU1987-082407A

DISCLOSURE OF THE INVENTION

Problems to be Solved by the Invention

Therefore, the problem to be solved by the present invention is to provide a sensor fixture which can fix a sensor easily and firmly without using a band.

SUMMARY OF THE INVENTION

In order to solve the problem, a sensor fixture according to the present invention is to be attached to a sensor attaching part. The sensor fixture includes a clamp body, two clamp arms, and a fixing bolt. The clamp body includes a sensor fixing portion for fixing a sensor above the center of the sensor attaching part, and two pivot coupling parts for pivotably coupling the clamp arms to the clamp body at left and right positions with respect to the sensor fixing portion, respectively. Each of the two clamp arms includes a protrusion, the protrusions contacting the sensor attaching part at laterally symmetrical positions when the two clamp arms pinch the sensor attaching part from the left and right. The fixing bolt includes a fastening part for coupling and fastening the two clamp arms below the protrusions.

Effects of the Invention

According to the present disclosure, a sensor can be fixed easily and firmly.

MODES FOR CARRYING OUT THE INVENTION

Hereinafter, one desirable embodiment of a sensor fixture according to the present invention will be described with reference to the accompanying drawings. Note that in the following description, a case where a long and narrow cylindrical tip part of a sensor is fixed to a pipe having an annular cross section in a contacting manner will be illustrated to describe the present invention. Note that dimensions of constituent members illustrated in each drawing are not intended to scale actual dimensions of the constituent members.

First Embodiment

Figure 1:
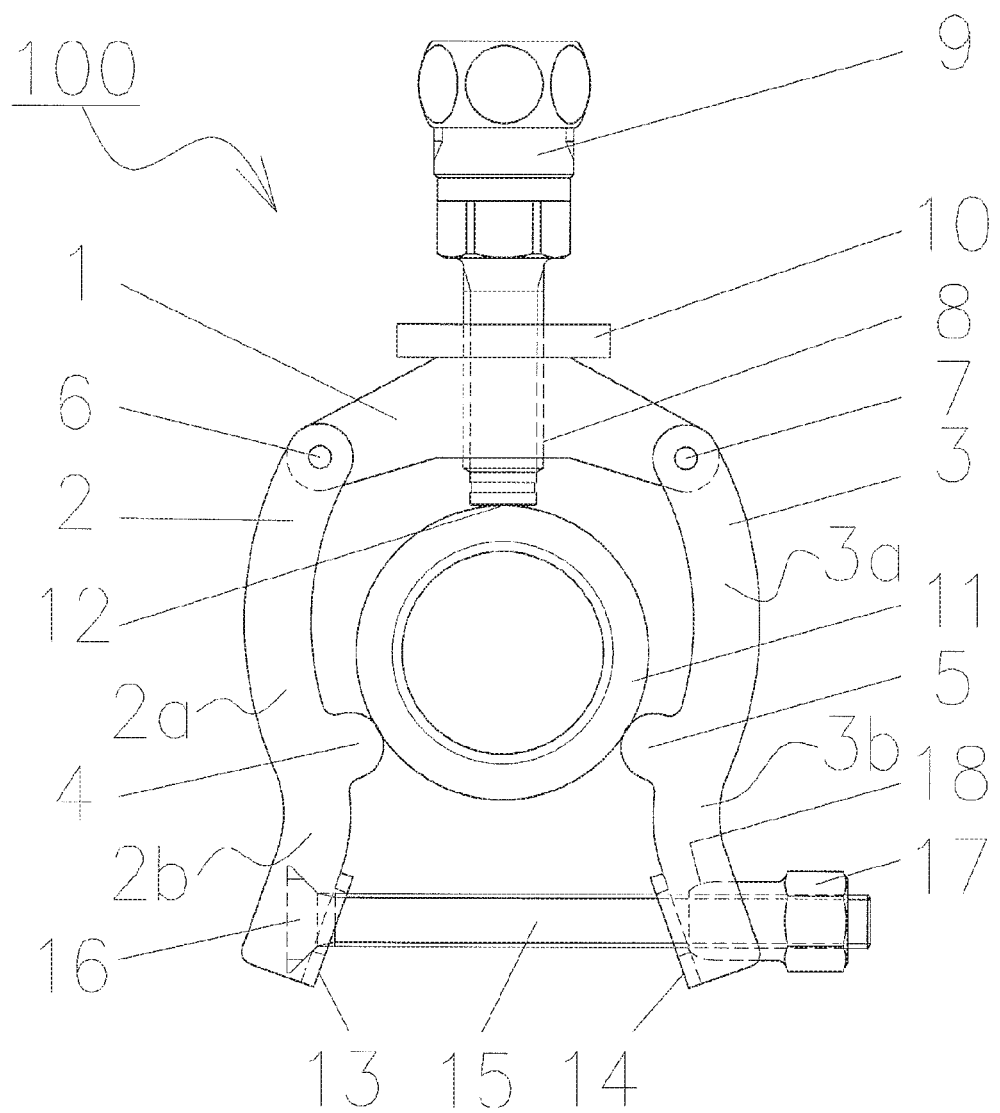
FIG. 1 is an elevational view illustrating one example of a sensor fixture according to a first embodiment of the present invention.
Figure 2:
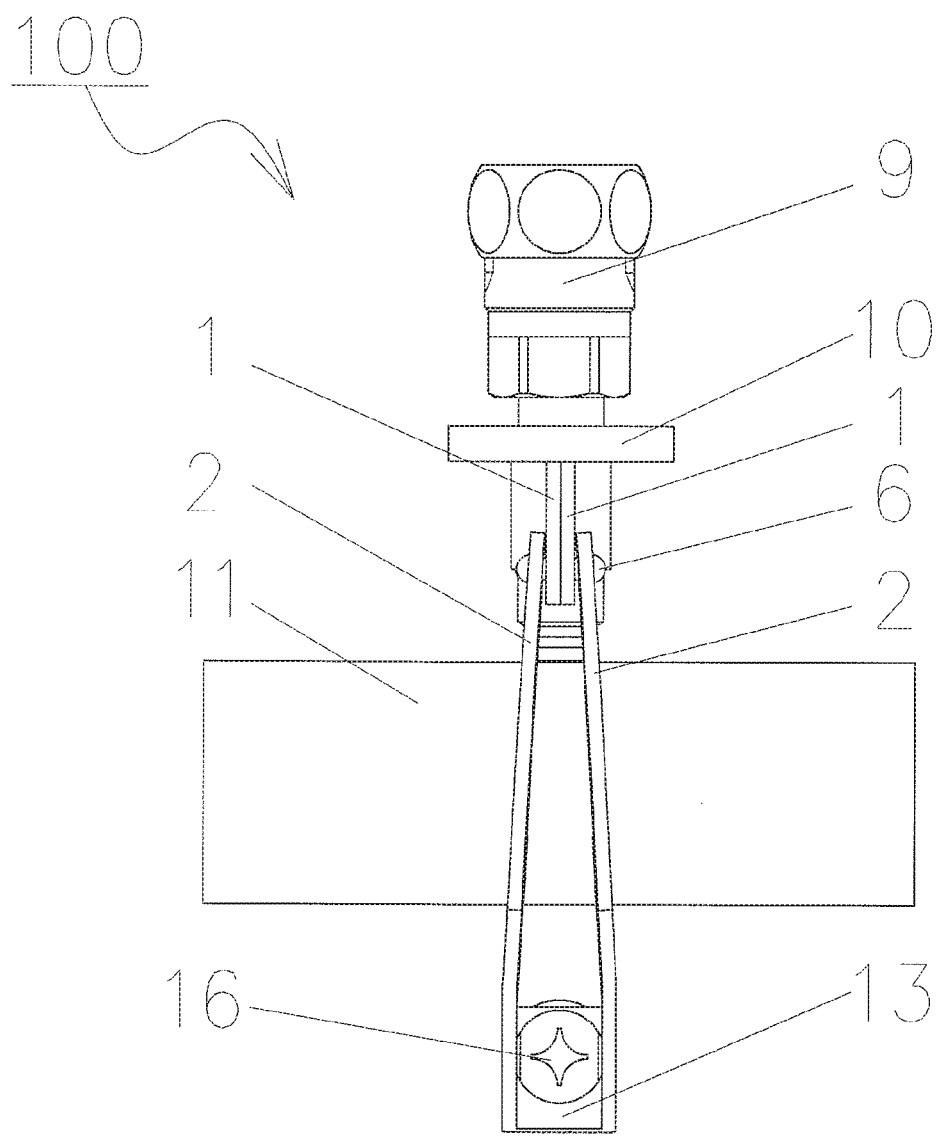
FIG. 2 is a left side view illustrating one example of the sensor fixture according to the first embodiment of the present invention.

FIG. 1 is an elevational view illustrating one example of the sensor fixture according to a first embodiment of the present invention. FIG. 2 is a left side view illustrating one example of the sensor fixture according to the first embodiment of the present invention.

As illustrated in FIG. 1, the sensor fixture 100 includes a clamp body 1, clamp arms 2 and 3 which are respectively attached to left and right sides of the clamp body 1, and a fixing bolt 15. The clamp arms 2 and 3 include protrusions 4 and 5, respectively.

The clamp body 1 can be fabricated, for example, by cutting out aluminum or die casting aluminum. Each of the clamp arms 2 and 3 can be fabricated, for example, by laminating two sheets of thin stainless steel plate having about 1 to 5 mm thickness so as to be separated from each other. The clamp arms 2 and 3 are coupled to left and right ends of the clamp body 1, respectively.

A sensor fixing portion 8 for fixing a sensor 9 is formed near the center of the clamp body 1. The sensor fixing portion is formed, for example, by cutting female threads corresponding to the center of an upper portion of a pipe (a sensor attaching part), and thus, can threadedly fix the sensor 9 on which male threads are cut.

A locknut 10 for fixing the sensor 9 more surely to the clamp body 1 is provided to an upper end of the clamp body 1. Loosening of the sensor 9 from the sensor fixing portion 8 can be prevented by fastening the locknut 10.

A tip end 12 of the sensor 9 constitutes a first supporting point against a pipe 11 by contacting an outer surface of the pipe 11 having the annular cross section. The sensor 9 can measure temperature, vibration, etc. of the pipe 11 by contacting the pipe 11. For example, the sensor 9 can measure the temperature of the pipe 11 at the contacting point by using a thermocouple. Further, for example, the sensor 9 can measure the vibration occurring at the pipe 11 by using a piezoelectric element.

The two thin stainless steel plates which constitute the clamp arms 2 and 3, respectively, are pivotably coupled to the left and right ends of the clamp body 1 by using rivets 6 and 7 (pivot coupling parts), respectively. For example, in FIG. 1, the clamp arm 2 is coupled to the left end of the clamp body 1 in the figure by using the rivet 6, and the clamp arm 3 is coupled to the right end of the clamp body 1 in the figure by using the rivet 7.

The clamp arms 2 and 3 have a substantially S-shape and are arranged laterally symmetrical. The clamp arm 2 is provided with the protrusion 4 formed somewhat below its longitudinal center, and the clamp arm 3 is provided with the protrusion 5 formed somewhat below its longitudinal center.

For example, the clamp arm 2 includes a first curved portion 2a and a second curved portion 2b, and the protrusion 4 is formed in a curve connecting portion between the first curved portion 2a and second curved portion 2b. Further, for example, the clamp arm 3 includes a first curved portion 3a and a second curved portion 3b, and the protrusion 5 is formed in a curve connecting portion between the first curved portion 3a and second curved portion 3b.

The protrusions 4 and 5 have a shape of semicircle or semi-ellipse, and may be made of same material as the clamp arms 2 and 3 or different materials from the clamp arms 2 and 3. In this embodiment, the protrusions 4 and 5 are made of the same material as the clamp arms 2 and 3, and integrally formed by press forming.

The protrusions 4 and 5 are disposed at laterally symmetrical positions with respect to the center of the pipe 11, where the protrusions 4 and 5 can contact outer circumference of the pipe 11 when the two clamp arms 2 and 3 pinch the pipe 11 from the left and right, respectively. Thus, the positions where thickened portions of the protrusions 4 and 5 contact the pipe 11 (contacting points of the circle) can constitute second and third supporting points against the pipe 11, respectively.

By disposing the second and third supporting points on the circumference of the circle of the pipe 11 having the annular cross section, on the other side of the first supporting point constituted by the tip end 12 of the sensor 9 so that the second and third supporting points are separated from each other, the sensor fixture 100 can be firmly fixed to the pipe 11. Note that central angles formed by the center of the circle of the pipe 11, and the first, second and third supporting points are preferred to be or be close to 120 degrees, respectively. Especially, the central angle formed by the center of the circle of the pipe 11, and the second and third supporting points is preferred to be less than 180 degrees.

Lubricant such as molybdenum disulfide is preferably applied to the contacting portions between each of the protrusions 4 and 5 and the pipe 11 in order to facilitate sliding movement on the outer circumferential surface of the pipe 11. Further, although the protrusions 4 and 5 have the shape of semicircle or semi-ellipse as described above, other shapes such as a mountain shape or a gear tooth shape are also applicable.

Side plates 13 and 14 are disposed at lower end portions of the clamp arms 2 and 3, respectively, contacting the two thin stainless steel plates in a substantially perpendicular manner. Each lower end portion is formed to have a channel shape in cross section when viewed from the protrusion 4 or 5.

A through-hole is respectively formed to the two side plates 13 and 14 which are coupling parts, so that the fixing bolt 15 is attached to penetrate the clamp arms 2 and 3. A head 16 of the fixing bolt 15 at the left end thereof has a cone shape, and a spherical seat nut 17 is threadedly coupled to the right end portion of the fixing bolt 15 in order to fasten the bolt.

A left end 18 of the spherical seat nut 17 has a sphere shape, and thus, a contacting area between the side plate 14 and the spherical seat nut 17 can be larger than if a flat seat nut is used, when the spherical seat nut 17 is fastened to the fixing bolt 15. Therefore, the clamp body 1 and the clamp arms 2 and 3 can surely be fixed to the pipe 11.

Note that a so-called quick nut may be used as the spherical seat nut 17 to fasten the fixing bolt 15 in order to fix the pipe 11. Further, since the clamp arms 2 and 3 respectively include the first curved portions 2a and 3a as described above, the clamp arms 2 and 3 can fix the pipe 11 of various diameters. Furthermore, because the protrusions 4 and 5 can slide on the outer circumferential surface of the pipe 11, the clamp arms 2 and 3 can fasten the pipe 11 at suitable supporting positions when fixing the pipe 11.

Note that, in the above description, one example of fixing the sensor fixture 100 to the pipe is illustrated; however, as an example other than the pipe, the sensor fixture 100 can also be fixed to a part having an annular cross section or a polygonal cross section, at an inlet or outlet of a variety of valves and steam traps.

[Modifications]

Although the clamp body 1 is directly coupled to the clamp arms 2 and 3, respectively, in the above description, one or more extension arms may be attached between the clamp body 1 and each of the clamp arms 2 and 3.

Figure 3:
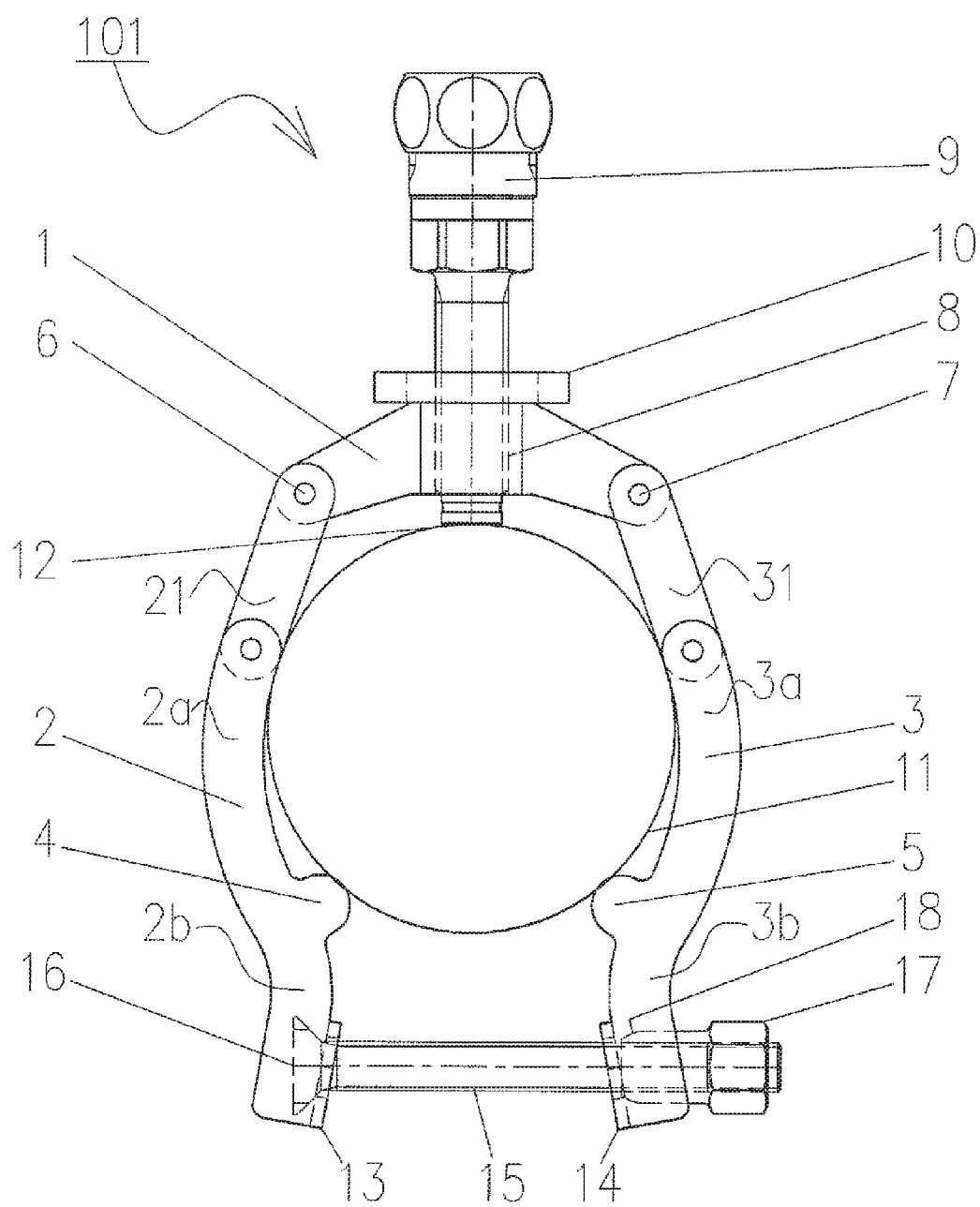
FIG. 3 is an elevational view illustrating one example of a sensor fixture according to one modification of the present invention.
Figure 4:
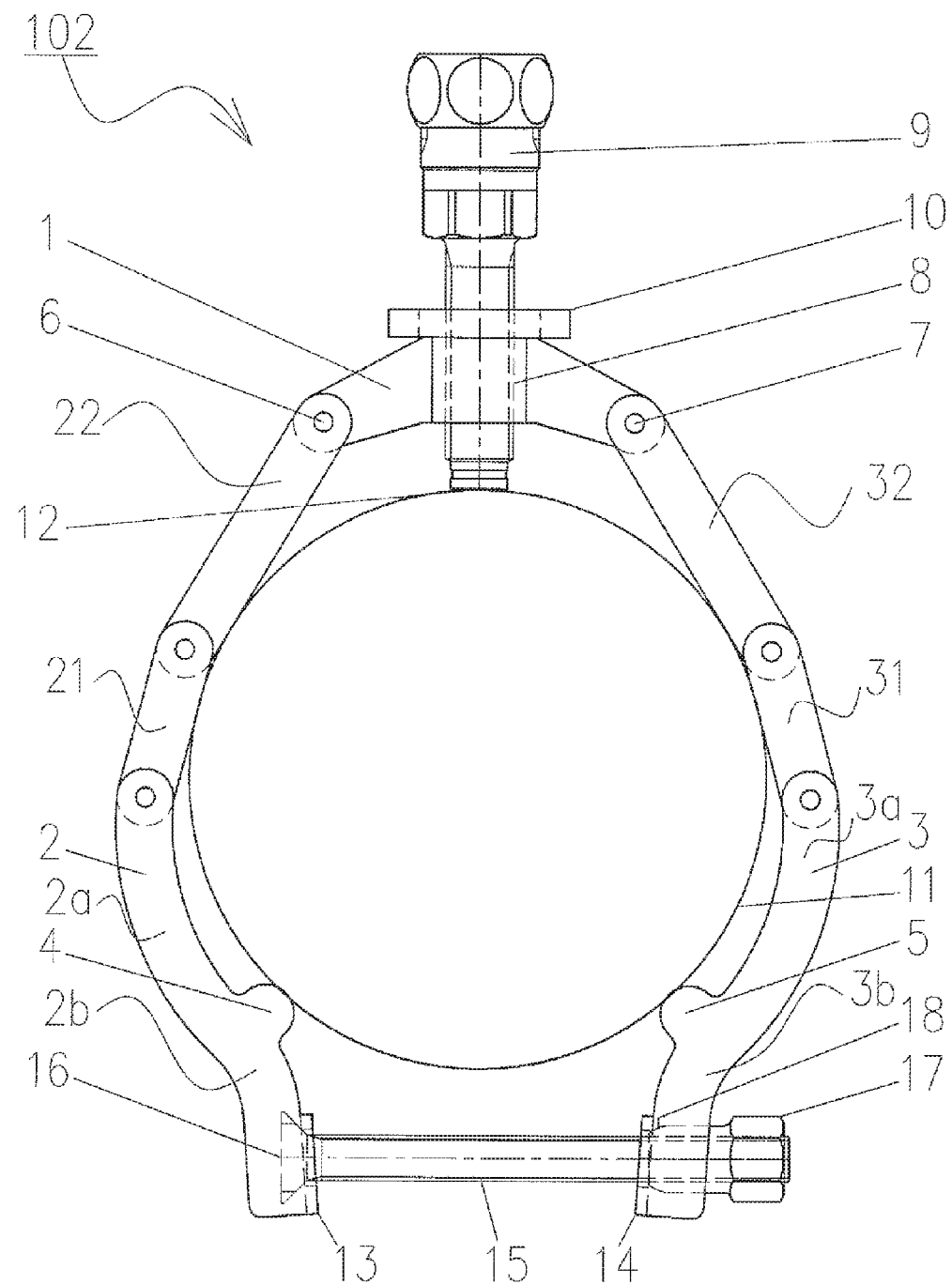
FIG. 4 is an elevational view illustrating one example of a sensor fixture according to another modification of the present invention.

FIGS. 3 and 4 are elevational views illustrating examples of sensor fixtures according to modifications of the present invention. FIG. 3 illustrates one example of the sensor fixture 101 in which first extension arms 21 and 31 are attached between the clamp body 1 and the clamp arms 2 and 3, respectively. FIG. 4 illustrates one example of the sensor fixture 102 in which the first extension arms 21 and 31, and second extension arms 22 and 32 are attached between the clamp body 1 and the clamp arms 2 and 3, respectively.

Thus, the protrusions 4 and 5 can be disposed at suitable positions according to the diameter of the pipe 11 by attaching one or more extension arms between the clamp body 1 and the clamp arms 2 and 3, respectively, and thereby, the sensor fixture can be surely fixed.

INDUSTRIAL APPLICABILITY

The present invention can be utilized as the sensor fixture which can fix the sensor easily and firmly to a variety of valves, steam traps, or circular cylindrical parts or polygonal parts of piping, etc.

DESCRIPTION OF REFERENCE NUMERALS

1 Clamp Body
2, 3 Clamp Arm
4, 5 Protrusion
9 Sensor
11 Pipe
15 Fixing Bolt

The invention claimed is:

1. A sensor fixture to be attached to a sensor attaching part, comprising:
    a clamp body;
    two clamp arms; and
    a fixing bolt,
    wherein the clamp body includes a sensor fixing portion for fixing a sensor so that a tip end of the sensor contacts the sensor attaching part, and two pivot coupling parts for pivotably coupling the clamp arms to the clamp body at left and right positions with respect to the sensor fixing portion, respectively,
    wherein each of the two clamp arms includes a protrusion disposed on a half of the clamp arm opposite to the pivotable coupling between the clamp arm and the clamp body, the protrusions being configured to contact the sensor attaching part at laterally symmetrical positions when the two clamp arms pinch the sensor attaching part from the left and right, wherein the protrusions are positioned on the clamp arms such that the laterally symmetrical positions are located in a half of the sensor attaching part, viewed as a transverse cross section, which is opposite to another half of the sensor attaching part that includes a portion contacted by the tip end of the sensor, wherein the protrusions are positioned on the clamp arms such that the protrusions are separate from the sensor fixed to the sensor fixing portion, and wherein the fixing bolt includes a fastening part for coupling and fastening the two clamp arms below the protrusions.

2. The sensor fixture of claim 1, wherein the sensor fixing portion is formed near the center of the clamp body.

3. The sensor fixture of claim 1, wherein the sensor attaching part is a pipe having an annular cross section, and the sensor measures one of temperature and vibration of the pipe at an outer surface thereof.

4. The sensor fixture of claim 3, wherein the sensor contacts the pipe at a position above a center of the circle of the pipe in the cross section, and the protrusions contact the pipe below the center of the circle of the pipe in the cross section.

5. The sensor fixture of claim 1, wherein the two clamp arms have a substantially S-shape and are arranged laterally symmetrical, and each of the protrusions is disposed between two curved portions constituting the S-shape.

6. The sensor fixture of claim 1, wherein two sheets of opposing side plate are attached to end portions of the two clamp arms on the other side away from the sensor fixing portion, respectively, and the fastening part couples and fastens the two clamp arms by fastening a spherical seat nut to the fixing bolt penetrating the side plates.

7. The sensor fixture of claim 6, wherein the spherical seat nut constituting the fastening part is a quick connection nut.

8. The sensor fixture of claim 1, wherein each of the two clamp arms includes a plurality of arm members.

9. The sensor fixture of claim 1, wherein each of the two clamp arms includes two sheets of thin plate, and the protrusion has one of a semicircle shape and a semi-ellipse shape, and is integrally formed with the clamp arm.

* * * * *

UNITED STATES PATENT AND TRADEMARK OFFICE
CERTIFICATE OF CORRECTION

PATENT NO. : 9,851,260 B2
APPLICATION NO. : 14/904204
DATED : December 26, 2017
INVENTOR(S) : Hideaki Yumoto Page 1 of 1

It is certified that error appears in the above-identified patent and that said Letters Patent is hereby corrected as shown below:

On the Title Page

Column 1, Item (22) PCT Filed, Line 1, delete "Feb. 7, 2014" and insert -- Jul. 2, 2014 --

Signed and Sealed this
Twentieth Day of March, 2018

Andrei Iancu
*Director of the United States Patent and Trademark Office*